US010274922B2

(12) United States Patent
Graf et al.

(10) Patent No.: US 10,274,922 B2
(45) Date of Patent: Apr. 30, 2019

(54) PROGRAMMABLE LOGIC CONTROLLER HAVING LOW LATENCY

(71) Applicant: SIEMENS AKTIENGESELLSCHAFT, München (DE)

(72) Inventors: Rene Graf, Zirndorf (DE); Michael Wieczorek, Erlangen (DE)

(73) Assignee: Siemens Aktiengesellschaft, München (DE)

(*) Notice: Subject to any disclaimer, the term of this patent is extended or adjusted under 35 U.S.C. 154(b) by 583 days.

(21) Appl. No.: 14/784,890

(22) PCT Filed: Apr. 16, 2013

(86) PCT No.: PCT/EP2013/057854
§ 371 (c)(1),
(2) Date: Oct. 15, 2015

(87) PCT Pub. No.: WO2014/169949
PCT Pub. Date: Oct. 23, 2014

(65) Prior Publication Data
US 2016/0077509 A1    Mar. 17, 2016

(51) Int. Cl.
*G05B 19/05*    (2006.01)
(52) U.S. Cl.
CPC .......... *G05B 19/054* (2013.01); *G05B 19/056* (2013.01); *G05B 2219/1144* (2013.01); *G05B 2219/1204* (2013.01)
(58) Field of Classification Search
CPC .... G05B 19/056; G05B 19/04; G05B 19/054; G05B 2219/1144; G05B 2219/1204
(Continued)

(56) References Cited

U.S. PATENT DOCUMENTS 4,931,922 A * 6/1990 Baty ................... G06F 11/0745
714/5.11
5,345,378 A * 9/1994 Lang .................... G05B 19/042
700/23
(Continued)

FOREIGN PATENT DOCUMENTS

CN    102156453 A    8/2011
CN    102667648 A    9/2012
(Continued)

*Primary Examiner* — Kenneth M Lo
*Assistant Examiner* — Chad G Erdman
(74) *Attorney, Agent, or Firm* — Henry M. Feiereisen LLC

(57) ABSTRACT

A method for operating a programmable logic control device to which a current input data set having state data regarding a peripheral component is provided cyclically by a communications bus after each bus cycle terminates. A first program instance of a control program is cyclically processed by a control device. The program cycle duration is longer than the bus cycle duration and, therefore, between the beginning and end of the program cycle, the communications bus provides at least one current data set that cannot be taken into account by the first program instance. To reduce the latency with which a control device reacts to a change in the input value of a peripheral component. at least one other program instance of the control program is cyclically processed so that it is temporally offset by less than one program cycle duration relative to the first program instance.

10 Claims, 3 Drawing Sheets

(58) Field of Classification Search
USPC .......................................................... 700/86
See application file for complete search history.

(56) References Cited

U.S. PATENT DOCUMENTS

| | | | | |
|---|---|---|---|---|
| 5,572,716 | A * | 11/1996 | Meisner | G06F 1/08 |
| | | | | 713/500 |
| 6,112,289 | A * | 8/2000 | Matsuo | G06F 9/3853 |
| | | | | 710/5 |
| 6,334,163 | B1 * | 12/2001 | Dreps | G06F 5/06 |
| | | | | 710/260 |
| 6,408,372 | B1 * | 6/2002 | Miyauchi | G11C 7/1006 |
| | | | | 711/167 |
| 6,542,999 | B1 * | 4/2003 | Dreps | G06F 5/06 |
| | | | | 710/20 |
| 7,047,440 | B1 * | 5/2006 | Freydel | G05B 19/0428 |
| | | | | 714/10 |
| 9,081,583 | B2 * | 7/2015 | Kee | G06F 8/34 |
| 9,618,924 | B2 * | 4/2017 | Nishiyama | G06F 9/544 |
| 2003/0121514 | A1 * | 7/2003 | Davenport | F24J 2/40 |
| | | | | 126/570 |
| 2003/0131158 | A1 * | 7/2003 | Berg | G06F 13/1657 |
| | | | | 710/6 |
| 2007/0214302 | A1 * | 9/2007 | Kubo | G06F 12/0806 |
| | | | | 710/305 |
| 2008/0244549 | A1 * | 10/2008 | Kejariwal | G06F 8/456 |
| | | | | 717/160 |
| 2011/0138152 | A1 * | 6/2011 | Ogura | G06F 9/30054 |
| | | | | 712/214 |
| 2011/0264244 | A1 * | 10/2011 | Pettigrew | G05B 19/4185 |
| | | | | 700/89 |
| 2012/0030650 | A1 * | 2/2012 | Ravindran | G06F 8/34 |
| | | | | 717/107 |
| 2012/0239201 | A1 * | 9/2012 | Kobayashi | G05B 19/056 |
| | | | | 700/275 |
| 2012/0260239 | A1 | 10/2012 | Martinez Canedo et al. | |

FOREIGN PATENT DOCUMENTS

| | | |
|---|---|---|
| CN | 102792237 A | 11/2012 |
| EP | 2381326 A2 | 10/2011 |
| GB | 2473751 A | 3/2011 |
| JP | 4320622 B2 | 8/2009 |
| WO | WO 0115384 A2 | 3/2011 |

* cited by examiner

PROGRAMMABLE LOGIC CONTROLLER HAVING LOW LATENCY

CROSS-REFERENCES TO RELATED APPLICATIONS

This application is the U.S. National Stage of International Application No. PCT/EP2013/057854, filed Apr. 16, 2013, which designated the United States and has been published as International Publication No. WO 2014/169949 pursuant to 35 U.S.C. 119(a)(d).

BACKGROUND OF THE INVENTION

The invention relates to a programmable logic control apparatus for a process and/or production installation, or installation for short. The control apparatus may be connected to a peripheral area of the installation, i.e. to sensors and/or actuators of assembly lines and machines in the installation, for example, via a field bus. The invention also includes a method for operating the programmable logic control apparatus. Finally, the invention also includes a solar heat installation and a computer program product.

In contrast to programs for a personal computer (PC), programs for a programmable logic controller have a strictly predetermined cycle. This is explained below with reference to FIG. 1. FIG. 1 shows a flowchart that illustrates how a field bus 10 transmits a respective current input data record in individual field bus cycles Zf over time t from a peripheral area (not shown) of an installation to a programmable logic control apparatus 12, or "control apparatus" for short. The control apparatus 12 executes a control program SPS for a control algorithm of the installation. The control program SPS is executed cyclically, that is to say one pass after the other, FIG. 1 representing two successive program cycles Zp of the control program SPS in their progression over time t.

Each program cycle ZP begins with the input data from the connected peripheral area being read in via the field bus. To this end, the control apparatus 12 copies the respective current input data record 14 from the field bus 10 to an input memory for a current input process image PAE. These data are then processed, and, at the end, the computed output data are written to the output memories again, from where the field bus reads them and transmits them to the peripheral area again. The memory for the input and output data is called a process image (PA). The portion for the input data is also shortened to PAE, and that for the output data is similarly shortened to PAA. From the input process image PAE, the control program SPS thus computes an output data record for an output memory image PAA during the program cycle Zp on the basis of the control algorithm. At the cycle end Ze, the output process image PAA, i.e. the data record having the control data for the peripheral area, is transferred to the field bus again, which transmits the output data record to actuating units of the peripheral area, which then actuate actuators of individual installation components. The transition between a cycle end and the next cycle beginning is called the cycle control point (ZKP), which is distinguished particularly by the fact that there is full data consistency in the output memory PAA, since all computation operations have concluded.

The field bus cycle that is used to ask the peripheral area for its current input data and to transmit available output data, computed by the control apparatus, thereto is independent of the program cycle Zp of the control apparatus 12. The field bus cycle time Tf is the time that the system needs in order to copy all the current input values that are transferred to the field bus from the peripheral area, as a current input data record, to the memory of the control apparatus as a current input process image PAE and to write the current output process image PAE that is present there to the peripheral area again as an output data record.

A program Zp takes a particular program cycle time Tz. This is longer than the field bus cycle time Tf that the field bus 10 uses to update current input data records at the data input of the control apparatus 12. In general, the principle here is that Tf<Tz. Orders of magnitude for standard PLC programs and configurations in this case are Tf<50 ms and Tz<1000 ms, meaning that an undesirable long time can elapse before there is a reaction to a change.

In the central peripheral area, instead of a field bus, what is known as a backplane bus is used, which generally operates even faster than a field bus. The text below refers to both bus types, that is to say a backplane bus and a field bus, and to further buses that can be used for a PLC generally as a communication bus.

Various methods are used to attempt to alter an existent PLC program such that individual portions thereof can be executed in parallel, so that by using a multicore or even many-core processor (multicore processor system) a control program is executed much faster without the programmer needing to fully program this explicitly.

Considerable problems arise in this context, however, because the hitherto sequential handling of a control program allows certain constructs that, when executed in parallel, result in unforeseeable events. An example that may be cited in this case is the use of a local variable (flag) that is repeatedly used in the various program sections as a buffer store for various computation operations. This is not a problem in a sequential control program. When individual portions of this control program are executed in parallel, implicit communication arises between these individual portions, since one program portion of the control program executed in parallel describes the variable while another portion reads this particular variable and therefore obtains an incorrect value. This is also called a data race.

SUMMARY OF THE INVENTION

The invention is based on the object of shortening the latency with which a control apparatus reacts to an alteration in an input value from a peripheral component.

According to one aspect of the invention, the object is achieved by a method for operating a programmable logic control apparatus that is provided with a current input data record having state data from a peripheral area by a communication bus cyclically whenever a bus cycle time has elapsed, wherein the method involves the control apparatus cyclically executing a first program instance of a control program and, in each program cycle, the first program instance copying, at the cycle beginning, the current input data record that is then provided in each case, then an output data record having control data of the peripheral area being computed from the copied input data record during the program cycle and, at the cycle end, the output data record being transferred to the communication bus (16) for transmission to the peripheral area, wherein a program cycle time of the program cycle is longer than the bus cycle time, so that, between the cycle beginning and the cycle end of the program cycle, the first program instance is provided with at least one further current input data record by the communication bus in each case, said further current input data record being ignored by the first program instance because the latter has not yet terminated its program cycle, wherein the control apparatus cyclically executes at least one further program instance of the control program with a timing shift of less than one program cycle time with respect to the first program instance, and the at least one further program instance processes in each case a different one of those input data records that are provided for the first program instance (30) by the communication bus between the cycle beginning and the cycle end of the program cycle.

According to another aspect of the invention, the object is achieved by a control apparatus for a process and/or production installation, having a bus port for interchanging input and output data records with a peripheral area of the installation via a communication bus and having a processor system for executing program instances of a control program, wherein the control apparatus is designed to perform a method as set forth above.

According to yet another aspect of the invention, the object is achieved in connection with the control of solar heat installations by a solar heat installation having a multiplicity of mirrors of repositionable design that represent a peripheral area of the installation, and having a central control apparatus as set forth above that is coupled to the peripheral area via a communication bus and that is designed to set a respective position for the mirrors using the control program on the basis of a position of the sun.

According to yet another aspect of the invention, the object is achieved in connection with the reinforcement of already existent control apparatuses by a computer program product having a program code that is stored on at least one storage medium and that is designed to perform a method as set forth above when the program code is executed by a processor system of a control apparatus for a process and/or production installation.

Advantageous developments of the invention are provided by the subclaims.

The method according to the invention is used for operating a programmable logic control apparatus that, in the manner already described, is provided with a current input data record having state data from a peripheral area by a communication bus, that is to say a backplane bus or a field bus, for example, cyclically whenever a bus cycle time has elapsed. By way of example, this input data record can comprise sensor data or values of state parameters from individual peripheral components, that is to say from the sensors or from actuator controllers, for example. The method involves the control apparatus cyclically executing or performing a program instance of a control program with a control algorithm. This program instance is subsequently called a first program instance. In each program cycle, the first program instance thus copies the current input data record at the cycle beginning, computes an output data record having control data for the peripheral area from the copied input data record during the program cycle and transfers the output data record to the communication bus for transmission to the peripheral area at the cycle end. In this case, the method according to the invention concerns the situation in which a program cycle time Tz of each program cycle of the program instance is longer than the bus cycle time Tf, so that between the cycle beginning and the cycle end of each program cycle the communication bus respectively provides at least one further current input data record that is ignored by the first program instance because the latter has not yet terminated its current program cycle.

The method according to the invention now involves the control apparatus executing at least one further program instance of the control program. In other words, the control apparatus executes the control program at least twice at the same time, specifically each one again cyclically. In this case, the program instances are executed at interleaved times. In other words, every further program instance has a timing shift of less than the program cycle time Tz with respect to the first program instance. In other words, between the cycle beginning and the cycle end of the first program instance there is at least one further cycle beginning of the at least one further program instance. Put another way again, the cycle control points of all the program instances have a timing shift with respect to one another. The at least one further program instance therefore handles in each case a different one of those input data records that are provided by the communication bus between the cycle beginning and the cycle end of the program cycle of the first program instance.

This new approach to the parallelization of an existent control program for a control algorithm results in the advantage that the maximum possible timing shift between a change in an input datum and the output of an associated control datum from the control apparatus can be systematically reduced by means of appropriate selection of the number of further program instances. In contrast to the approaches and methods that split an existent program into parallelizable sections (threads) by means of analysis, the method according to the invention allows the existent computation power to be used in order to execute the same control program repeatedly, in parallel in a manner shifted in time.

It is particularly advantageous if the program instances executed in parallel process their respective data independently of any other program instance. In that case, neither the programmer nor the engineering system nor the runtime system needs to take special precautions against programming that is incorrect for parallelization (data race), since the individual program instances running in parallel operate on their own data and are therefore completely independent.

Preferably, a multicore or many-core processor is used such that each processor core (core) executes the same control program, that is to say a respective program instance of the control program, but with a certain timing shift with respect to a "neighbor", that is to say with respect to the next program instance. Accordingly, in one development of the method, a multicore processor system is provided in the control apparatus and each program instance is executed by a different one of the processor cores of this multicore processor system. This results in the advantage that there are no changeover operations between the individual program instances within a single processor core, which could otherwise alter the timing shift that is set between the program instances.

In this context, the method according to the invention scales absolutely linearly with the number of available processor cores (insignificant start and stop phases not included). A useful limit is reached when, for N processor cores, the timing shift between the program instances corresponds to the field bus cycle time, that is to say: $Tz=N*Tf$. According to one embodiment of the method, useful automatic configuration of the control apparatus is obtained when, in a configuration phase of the control apparatus, that is to say after the latter has been switched on, for example, an analysis device, such as a program module of the control apparatus, ascertains the program cycle time Tz and the bus cycle time Tf and the ascertained time values (program cycle time and bus cycle time) are taken as a basis for predetermining a number of instances of the control program and a timing shift for the at least one further program instance of the control program with respect to the first program instance. An implementation of this method can measure a sequential pass of this control program, compute the timing shift using the measured sequential pass and the number of actual processor cores N, and can then repeatedly start the control program in staggered fashion as single program instances on the available processor cores.

Instead of the number of processor cores, it is also possible to arbitrarily predetermine a different maximum number of program instances as a basis for computing the timing shift and the number of program instances (e.g. max. N=4, for N=8 actual processor cores, if this is beneficial).

In another development of the method, the program instances are designed to transfer such control data as have been computed in full during the program cycle, i.e. before the cycle end, to the communication bus even before the actual cycle end for the purpose of transmission to the peripheral area. In that case, they are thus transmitted to the peripheral area not first with the output data record having the final output data but rather as early as one or two or even more bus cycles earlier. Such optimization of the control program has the advantage that the latency can be reduced still further even when there are fewer process cores available than necessary, in order to execute as many program instances of the control program as would theoretically be necessary for executing each input data record provided by the field bus. In order to optimize a control program in the manner described, analysis of the control program is necessary. This involves analyzing when an output datum, that is to say a particular control datum for the peripheral area, has been computed in full during the actual program cycle and is no longer used, in particular is not altered by follow-up computation operations. This control datum is then implicitly copied to the memory for the output process image PAA of the communication bus at this instant, so that it is transmitted to the peripheral area during the next bus cycle.

Another development of the method relates to connection of the control apparatus to an external planning and/or operator control system, such as an operator control unit (HMI—human machine interface). In this context, the control apparatus is connected to the external planning and/or operator control system via a communication interface, that is to say an Internet network connection, for example, that is different than the bus port or via an interprocess communication interface. Control selections, for example a target speed or a target pitch angle, can thus be received from the external system via the communication interface and transferred to the cycle control point (ZKP) of any program instance running in parallel. As a result, in the case of parallelization through the execution of a plurality of programs, full data consistency between the program instances is obtained after the control selections are received.

For a read request from the external system, there are two options. If at least one read request for output of the current output data record and/or of the current controller state is received via the communication interface, the control apparatus outputs the requested output data either to a firmly predetermined program instance or to that program instance whose program cycle ends next at the end of the cycle end that immediately follows in time. In this case, the output is made via the communication interface. In other words, it is thus so that either one of the program cycles running in parallel is defined as a master and only the output data of said program cycles are ever reported outside to the external system, or the read request is executed on the ZKP that is reached next on any program instance.

As already explained, the invention also includes a control apparatus for a process and/or production installation. The control apparatus according to the invention has a bus port for interchanging input and output data records with a peripheral area of the installation via a communication bus, and a processor system. The processor system is designed to execute program instances of a control program that provides a control algorithm for the peripheral area. Preferably, the processor system has a plurality of processor cores. The control apparatus according to the invention is designed to perform embodiments of the method according to the invention.

An installation that can benefit from the method according to the invention is a solar heat installation, for example. In this type of installation, mirrors that focus sunlight need to be tracked to the position of the sun. The number of mirrors is relatively large, which means that the program cycle time of a control program for controlling the mirror positions is considerably above the time of a field bus, that is to say the bus cycle time. In this connection, a solar heat installation according to the invention provides for the peripheral installation, that is to say the mirrors of repositionable design, to be coupled to a central control apparatus via a communication bus, the control apparatus being an embodiment of the control apparatus according to the invention. The control apparatus sets a respective position for the mirrors using the control program on the basis of a position of the sun. In this case, each instance of the control program controls the mirror position of a plurality of, particularly all, mirrors. Nevertheless, this does not result in undesirably great latency, since the number of program instances makes it possible to set the maximum number of bus cycles that are needed before an output data record is available for altering input data.

In connection with the solar heat installation, the computation of output data is dependent only on external values, namely the position of the sun and possibly further environmental values. Therefore, the control program can be parallelized very easily by simply executing a plurality of program instances in parallel in a manner shifted in time. This allows the quality of the mirror tracking to be significantly improved.

In order to reinforce a conventional control apparatus likewise for the purposes of the method according to the invention, the computer program product according to the invention provides for a computer program code that is stored on at least one storage medium, that is to say a hard disk or a CD-ROM. The program code is designed to perform an embodiment of the method according to the invention when executed by a processor system of a control apparatus for a process and/or production installation.

BRIEF DESCRIPTION OF THE DRAWING

The invention is explained once again below precisely using a specific exemplary embodiment. To this end.

DETAILED DESCRIPTION OF PREFERRED EMBODIMENTS

In the case of the exemplary embodiment explained below, the components in the embodiment that are described and the steps of the method that are described are each individual features of the invention that can be considered independently of one another and that each also develop the invention independently of one another and hence can also be regarded as part of the invention individually or in a combination other than that shown. Furthermore, the embodiments described can also be limited by further features among the features of the invention that have already been described.

The embodiment shown is a preferred embodiment of the invention.

Figure 1:
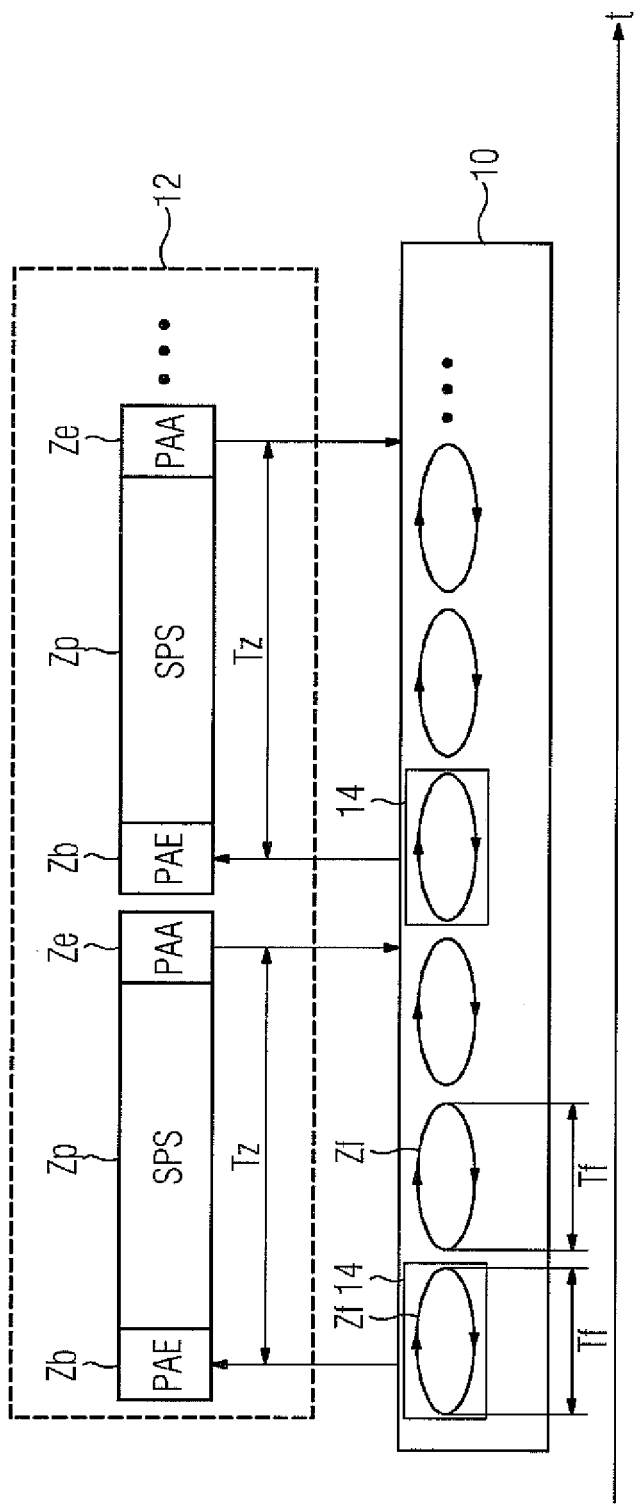
FIG. 1 shows a diagram with timing for computational and transmission operations in an installation according to the prior art.
Figure 2:
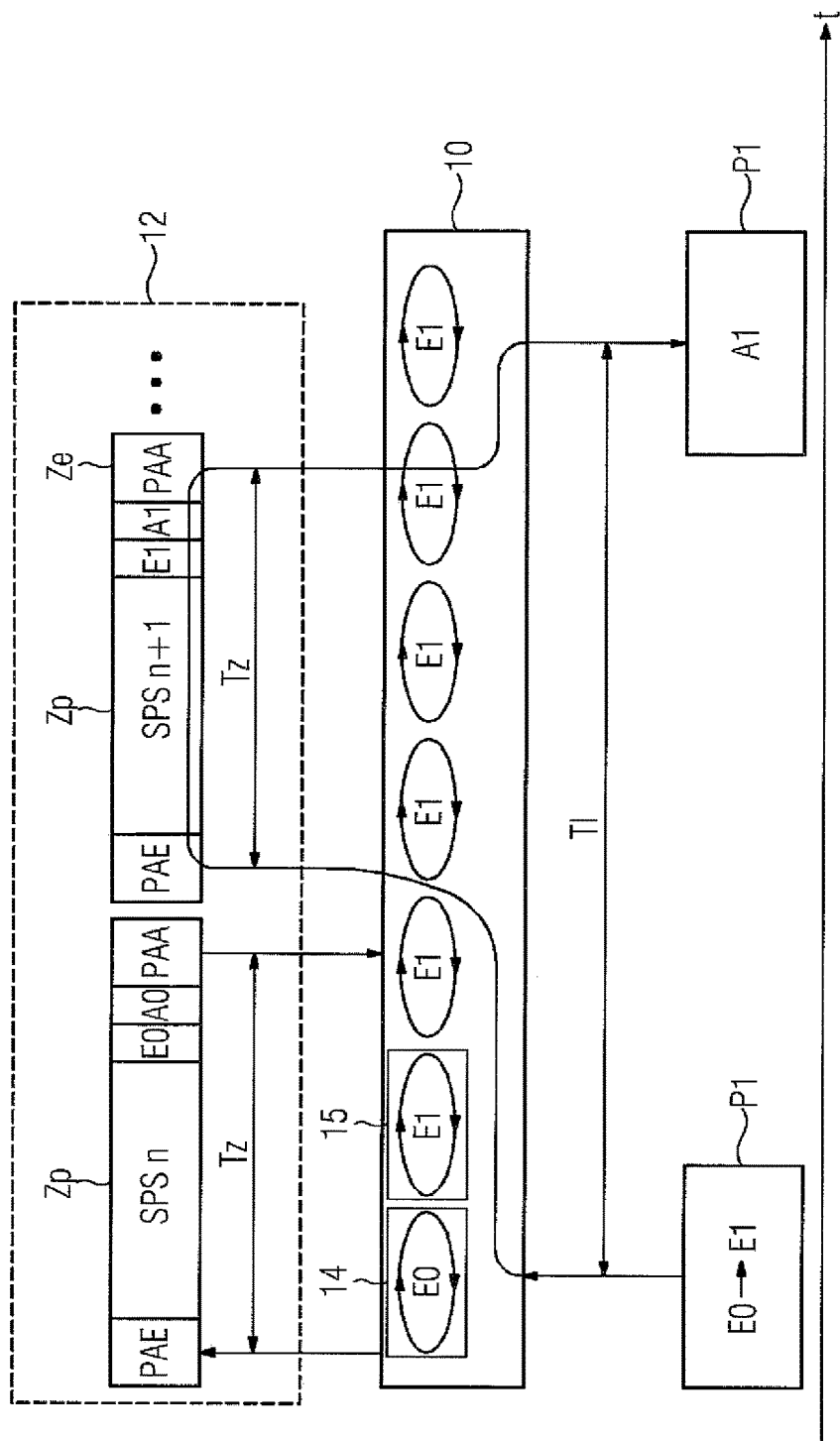
FIG. 2 shows a diagram with timing for processing of a data change in the installation from FIG. 1.

FIG. 2 is first of all used to explain how, overall, in a programmable logic controller from the prior art, a latency that can amount to almost twice the program cycle time can arise between a change in the peripheral area and an associated reaction by the control provided by the PLC. In this regard, FIG. 2 once again shows the system known from the prior art, as shown in FIG. 1.

The reading-in of the input data for a single program cycle of the control program of the PLC is produced by the cycle beginning by copying the current content of the input data memory PAE written by the field bus, and the copy then serves as a basis for all computational operations for the output data record, from which output data record an output process image PAA associated with this program cycle is then produced. This output process image is transferred to the field bus only at the cycle end, that is to say after a program cycle time Tz, however, so that said field bus writes the output values to the peripheral area. Between a current input data record and the associated output data record computed by the control algorithm of the control program, there is therefore a latency that corresponds to the program cycle time (transmission times via the field bus not included).

FIG. 2 additionally shows a peripheral component P1 of the installation, which can comprise a sensor, for example, that outputs a sensor value to the field bus 10 as an input datum for the input data records. At an instant marked along the timeline for the time t in FIG. 2, the sensor value changes from an input value E0 to an input value E1. The field bus 10 transmits the changed sensor value as part of an input data record 15 and of the subsequent input data records to the control apparatus 12.

As FIG. 2 shows, the control apparatus 12 has, immediately prior to the arrival of the input data record 15, copied an input data record 14 to the input memory as an input process image PAE for handling by a program cycle Zp and has begun computing an output data record. This program cycle Zp is denoted by the index n in this case. Since the current input data record 14 has in this case been read in immediately before the arrival of the input data record 15, the input value E0 is used for computing an associated control value A0 that forms an output value of the output data record. Only upon the next program cycle Zp, which in this case has the index n+1, is the changed input value E1 used for computing an associated control value A1. Only at the cycle end Ze of the program cycle Zp with the index number n+1 is the control value A1 for the changed input value E1 then output to the field bus 10, so that it arrives at the peripheral component P1, for example, with a latency or time delay T1. From the point of view of the peripheral component P1, a latency or delay T1 therefore arises that, in the worst case, can amount to almost twice the program cycle time Tz.

Any change in an input value on a peripheral component is thus always transmitted to the control apparatus 12 with the bus cycle time Tf (that is to say in a period Tf). Said control apparatus does not take account of the new value E1 until at the beginning of a next program cycle Zp, however, when the copy of the next input process image PAE is produced. The input data are then processed in this program cycle Zp (in this case index n+1), so that although the preceding program cycle Zp (in this case index n), which processes the old input value E0, is handled after the change in the input value (E0→E1), it does not take the altered value E1 as a basis.

Figure 3:
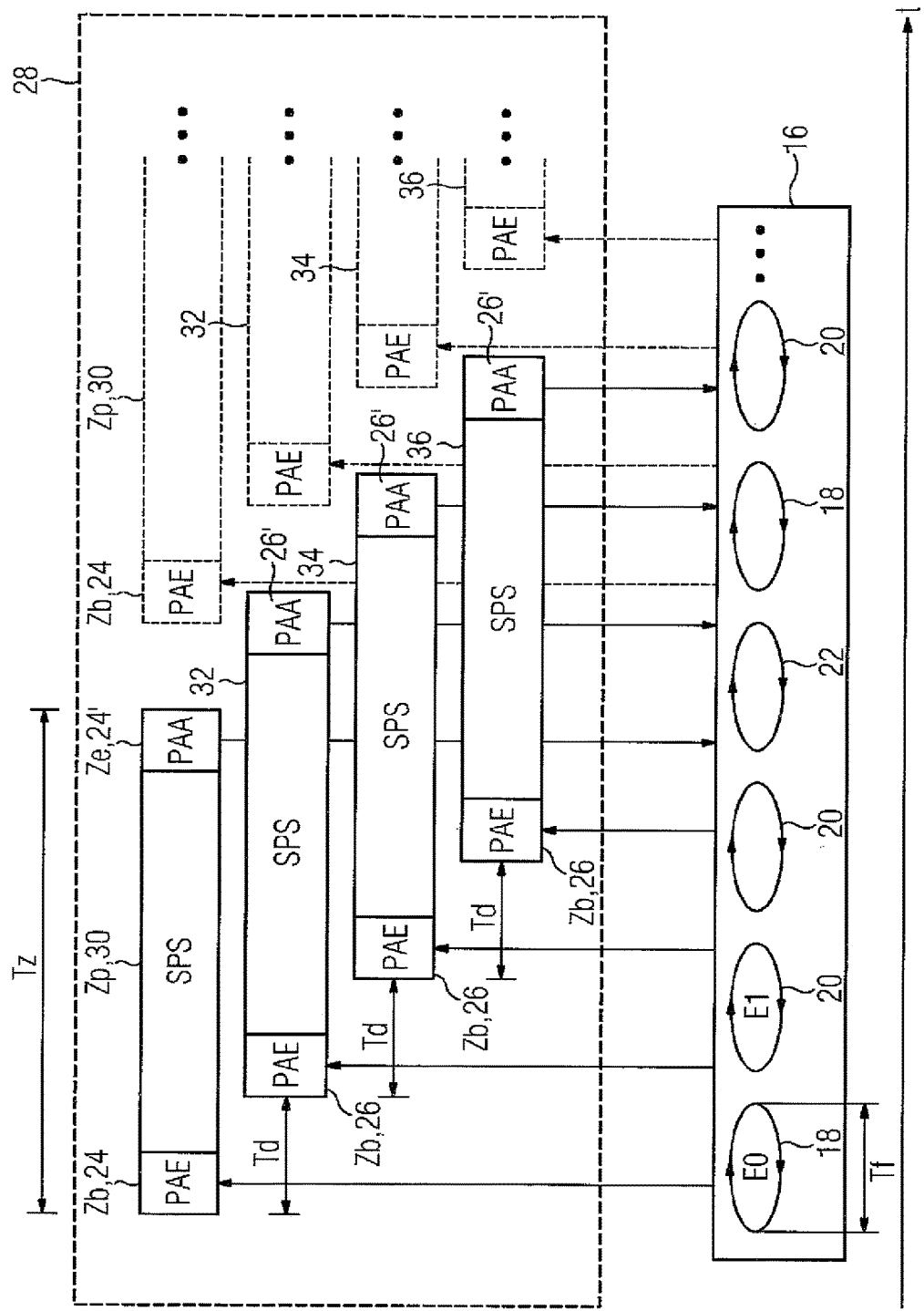
FIG. 3 shows a diagram with timing for transmission and computation operations, as arise in an installation that has an embodiment of the control apparatus according to the invention.

FIG. 3 illustrates how an embodiment of the method according to the invention involves, in an embodiment of the control apparatus according to the invention, respective current input data records 24, 26 being copied over time t in a field bus of a communication bus 16 from the field bus 16 to a control apparatus 28 as an input process image PAE in individual bus cycles 18, 20, 22. The control apparatus 28 executes a plurality of program instances 30, 32, 34, 36 of the same control program SPS. In other words, a plurality of control programs having the same control program text are executed at parallel times. The program instances are each executed cyclically in this case, that is to say ever repeatedly. By way of example, each program instance 30, 32, 34, 36 can be executed by a dedicated processor core of the processor system of the control apparatus 28.

In each program cycle Zp, the program instance 30 copies an input data record 24 from the field bus 16 to a memory of the control apparatus 28 as an input processor image PAE at the cycle beginning Zb, computes control data therefrom as an output data record 24' during the program cycle Zp in the manner described and, at the cycle end Ze, outputs the output process image PAA produced in this manner to the field bus 16 after a program cycle time Tz, said field bus transmitting the output data record 24' to peripheral devices in the manner described. By way of example, the control apparatus 28 can control the solar heat installation described. The program cycle time Tz is longer than the bus cycle time Tf. FIG. 3 again shows, as in FIG. 2, that in two successive field bus cycles the respective current input data record transmits first of all an input value E0 and then an input value E1 to the control apparatus 28. Unlike in the example of FIG. 2, the change in the input datum to the value E1 is immediately used by one of the further program instances 32 to compute a correspondingly adjusted output data record 26'.

To this end, the program instances 30, 32, 34, 36 have been started by the control apparatus 28 in a manner staggered by a timing shift Td with respect to one another. The timing shift Td is shorter than the program cycle time Tz. The program instances 30, 32, 34, 36 are thus executed in parallel with one another at interleaved times. In the example shown, the control cycle is executed four times in parallel, e.g. from four different processor cores. In other words, there are four program instances 30, 32, 34, 36. Whenever a cycle starts, the current input data record 24, 26 of the respective field bus cycle 18, 20, 22 is copied to the memory of the control apparatus as an input process image PAE and processed. This increases the sampling rate of the control apparatus 28 in relation to the input data records that are provided by the field bus 16. This increases the quality or the number of computation operations on new, current output data records 24', 26'. Hence, the output data records are adjusted to suit the alteration of the input values (E0 to E1 in the example) correspondingly more quickly and appropriate output data records having suitable control values are transmitted to the peripheral area more quickly. In the example shown, immediately after the program instance 30 has output an output value for the input value E0 in a field bus cycle 22, for example, the next program instance 32 that has sensed the changed input value E1 first outputs a suitable output value for the changed input value E1 to the field bus 16 with the timing shift Td.

What is claimed is:

1. A method for operating a programmable logic control apparatus, comprising the steps of:
   receiving a current input data record from a communication bus each time a bus cycle time elapses, said input data record having state data from a peripheral area,
   cyclically executing a first program instance of a control program and at least one further instance of the control program, each program instance copying a current input data record and computing an output data record having control data computed from the respective copied input data record during a respective program cycle,
   providing the output data record to the peripheral area using the communication bus at the end of the program cycle of the respective program instance, the program cycle time being longer than the bus cycle time so that, between the beginning and end of the program cycle, the first program instance receives at least one further current input data record from the communication bus, said further current input data record not being used by the first program instance because the first program instance program cycle has not yet terminated,
   providing a timing shift of less than one program cycle for executing the at least one further program instance with respect to the first program instance, wherein input data records are received for processing by one of the program instances from the communication bus, different input data records being processed by the first program instance and by the at least one further program instance, respectively, the input data record processed by the at least one other program instance being received between the beginning and end of the program cycle of the first program instance,
   ascertaining the program cycle time and the bus cycle time of the control apparatus using an analysis device, and
   predetermining a number of instances of the control program and a timing shift for at least one further instance of the control program with respect to the first program instance using the ascertained time values,
   wherein the predetermined number of instances of the control program is additionally predetermined by a number of available computation cores in a multicore processor system of the control apparatus and the timing shift is predetermined for even distribution of the program instances over time.

2. The method of claim 1, wherein the program instances executed in parallel by the control apparatus each process their respective data independently of any other program instance.

3. The method of claim 1, wherein the control apparatus has a multicore processor system and each program instance is executed by a different one of the processor cores.

4. The method of claim 1 further comprising the step of providing control data that has been computed in full by a program instance to the communication bus before the end of the program cycle of that program instance for transmission to the peripheral area.

5. The method of claim 1 further comprising using an external planning and/or operator control system to receive, via a communication interface that is different from a bus port, at least one read request for output of the current output record and/or the current controller state, and using the communication interface to output the requested output data a) to a predetermined program instance or b) to a program instance having a program cycle that ends at the cycle end time that immediately follows the read request.

6. A programmable control apparatus configured to control a process and/or production installation, said control apparatus comprising:
   a bus port configured to interchange Input and output data records with a peripheral area of the installation via a communication bus; and
   a processor system having a system control program fixed in a non-transitory machine-readable medium and configured to execute multiple instances of a control program, said system control program including:
   a routine configured to receive a current input data record having state data from a peripheral area from a communication bus each time a bus cycle time elapses,
   a routine configured to cyclically execute a first program instance of a control program and at least one further instance of the control program, the program instances copying the current input data record and computing an output data record having control data computed from the copied input data record during the respective program cycle,
   a routine configured to provide the output data record to the communication bus for transmission to the peripheral area at the end of the cycle, the program cycle time being longer than the bus cycle time, so that, between the beginning and end of the program cycle, the first program instance receives at least one further current input data record from the communication bus, said further current input data record not being used by the first program instance because the first program instance program cycle has not yet terminated,
   a routine configured to provide a timing shift of less than one program cycle time for the execution of the at least one further program instance with respect to the first program instance,
   a routine configured to receive an input data record for processing by one of the program instances, different input data records being received from the communication bus being processed by the first program instance and by the at least one further program instance, respectively, the data record being processed by the at least one other program instance being received between the beginning and end of the program cycle of the first program instance,
   a routine configured to ascertain the program cycle time and the bus cycle time of the control apparatus using an analysis device, and
   a routine configured to predetermine a number of instances of the control program and a timing shift for at least one further instance of the control program with respect to the first program instance using the ascertained time values,
   wherein the predetermined number of instances of the control program is additionally predetermined by a number of available computation cores in a multicore processor system of the control apparatus and the timing shift is predetermined for even distribution of the program instances over time.

7. The programmable control apparatus of claim 6, wherein the installation is a solar heat installation further comprising:
multiple repositionable mirrors in a peripheral area of the installation, and wherein the control apparatus is a central control apparatus coupled to the peripheral area via a communication bus, said control apparatus setting the position of the mirrors as a function of a position of the sun using a respective control program.

8. A computer program fixed in a non-transitory machine readable medium and configured to execute multiple instances of a control program, said computer program comprising:
a routine configured to cyclically execute a first program instance of a control program and at least one further instance of the control program, the program instances copying the current input data record and computing an output data record having control data computed from the copied input data record during the respective program cycle,
a routine configured to transfer the output data record to the communication bus for transmission to the peripheral area at the end of the cycle, the program cycle time being longer than the bus cycle time, so that, between the beginning and end of the program cycle, the first program instance receives at least one further current input data record from the communication bus, said further current input data record not being used by the first program instance because the first program instance program cycle has not yet terminated,
a routine configured to provide a timing shift of less than one program cycle time for the execution of the at least one further program instance with respect to the first program instance,
a routine configured to receive an input data record for processing by one of the program instances, different input data records being received from the communication bus being processed by the first program instance and by the at least one further program instance, respectively, the data record being processed by the at least one other program instance being received between the beginning and end of the program cycle of the first program instance,
a routine configured to ascertain the program cycle time and the bus cycle time of the control apparatus using an analysis device, and
a routine configured to predetermine a number of instances of the control program and a timing shift for at least one further instance of the control program with respect to the first program instance using the ascertained time values,
wherein the predetermined number of instances of the control program is additionally predetermined by a number of available computation cores in a multicore processor system of the control apparatus and the timing shift is predetermined for even distribution of the program instances over time.

9. The programmable control apparatus of claim 6, further comprising a routine configured to provide control data that has been computed in full by a program instance to the communication bus before the end of the program cycle of that program instance for transmission to the peripheral area.

10. The computer program of claim 8, further comprising a routine configured to provide control data that has been computed in full by a program instance to the communication bus before the end of the program cycle of that program instance for transmission to the peripheral area.

* * * * *